B. DARROW.
BREAKER STRIP FOR TIRES.
APPLICATION FILED DEC. 26, 1917.
1,400,269.
Patented Dec. 13, 1921.
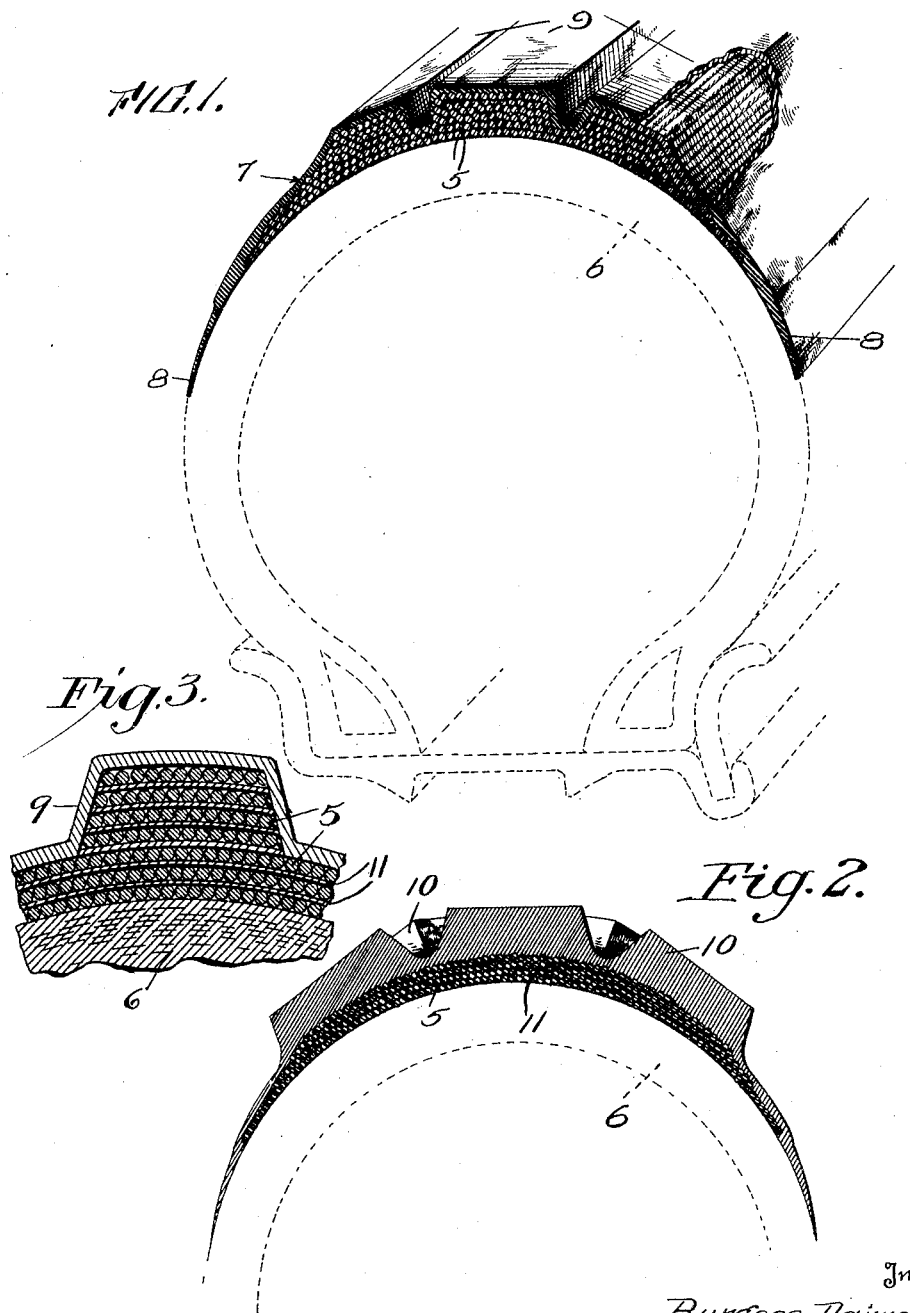

UNITED STATES PATENT OFFICE.

BURGESS DARROW, OF AKRON, OHIO, ASSIGNOR TO THE GOODYEAR TIRE & RUBBER COMPANY, OF AKRON, OHIO, A CORPORATION OF OHIO.

BREAKER-STRIP FOR TIRES.

1,400,269.     Specification of Letters Patent.     Patented Dec. 13, 1921.

Application filed December 26, 1917. Serial No. 208,888.

*To all whom it may concern:*

Be it known that I, BURGESS DARROW, a citizen of the United States, residing at Akron, in the county of Summit and State of Ohio, have invented new and useful Improvements in Breaker-Strips for Tires, of which the following is a specification.

The present invention relates to pneumatic vehicle tires, and has more particularly reference to the breaker strip or bands which are frequently interposed between the carcass of a tire of this type and the tread band thereof, in order to absorb the shocks of severe road usage.

It is within the knowledge of the present inventor that it has previously been proposed to provide breaker strips or bands for pneumatic tires comprising a series of heavy cords laid in parallelism and circumferentially of the tire carcass just prior to the placement of the tread upon the carcass to complete the tire. It is also within the knowledge of the inventor that it has been proposed at various prior times to reinforce the tread of pneumatic tires by filling them with fabric or cords whose function is to strengthen the tread against wear and consequently prolong the life of the tire.

But as a particular object of my present invention, I contemplate the provision of a breaker strip so constructed as to occupy approximately the entire tread portion of the tire, this particular strip functioning not only to absorb and distribute more equally over the inner carcass of the tire those shocks incident to unusually severe service, but also functioning to reinforce the tire tread throughout its maximum depth, thus increasing the longevity of the tire carcass from two distinct standpoints, and by the provision of but a single device.

It is another object of this invention to provide a breaker band for a tire carcass which is of such a nature that it may be built up into the tread space without being subject to certain well known disadvantages to which tire reinforcements are open. For instance, any fabric or cord reinforcement, which is radial to the center of the tire, will act as a wick to absorb and conduct moisture when the tread is so worn that the reinforcement is exposed, thus causing such corrosion and decay as will bring about the premature disintegration of the tire as a whole.

On the other hand, I have discovered by experiment that cords which reinforce the tread in a circumferential and unconnected fashion will not act to conduct moisture inwardly into the tire even when they are exposed from cutting or wearing of the tread. Moreover, loosely laid circumferential cords provide a more desirable breaker strip, in as much as they do not rob the tire of the degree of resiliency commensurate with that degree of absorption of road shocks which is the first office of a breaker strip.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawing, wherein there has been illustrated a preferred embodiment of the invention as it is reduced to practice, and throughout the several views of which, similar reference numbers designate corresponding parts:

Figure 1 is a diagrammatical perspective view of a tire section showing the use of the tread reinforcing breaker strip contemplated by this invention;

Fig. 2 is a similar diagrammatical sectional view of a tire of different tread construction, showing the application of this invention thereto; and Fig. 3 is an enlarged fragmentary sectional view.

In the preferred embodiment of my invention, I employ a cord winding, the cord being of such strength and diameter as may be found appropriate by practical experiment, and being preferably furnished with a rubber coating, although the present invention does not hinge upon this point. In practising the invention, the first step is to construct a breaker strip in the usual fashion, consisting of one or two layers 5 of the cord winding, which is circumferentially applied to the tire, the lowermost ply extending over the entire tread surface of carcass 6. After thus building the equivalent of an ordinary breaker strip, I continue the circumferential winding of the cord upon the previously applied layer or layers until the different layers of the cord winding build out the breaker strip and extend into the tread area such a very substantial distance as to form a more material reinforcement of the tread.

It will be observed by reference to Fig. 3 of the drawing that the cord sections of each particular layer of cord are separated from the cord sections of the adjacent layer by a thin sheet of rubber 11. Over the whole built-up mass of cord winding I lay a relatively thin rubber coating 7 which is carried laterally to a knife edge 8 to merge into the entire mass of the carcass 6. The tire with its built-up tread is then placed into a mold and vulcanized in the usual manner, during which process the tread rubber 7 is cured relatively hard while the various layers of cord winding 5 are unified into a yielding mass, which offers a tremendous resistance to any direct blow upon the tread of the carcass, and which reinforces the tread to such an extent that its wearing qualities are very considerably improved, while at the same time the desirable resiliency of the carcass is not lost.

In Fig. 1 I have illustrated a tire constructed in accordance with the foregoing description, the tread of the tire being given a conformity in its cure which is particularly appropriate for use upon tires constructed in the fashion I have just set forth. The tread design of this figure includes a plurality of ribs 9 which cover the tread surface of the tire in circumferential parallelism. It will be seen that the embodiment of such a design will not interfere with the continuity of the cord lengths of any layer of the cord winding, and therefore, permits the most efficient reinforcement of the tread.

In Fig. 2 I have illustrated a tire, the tread of which is formed of semi-separate blocks 10. It will be apparent that in a tread of this character, the cord lengths would be exposed between circumferential alined blocks 10 if the cord winding were continued entirely throughout the tread portion of the tire in the same manner that was proposed in the construction of Fig. 1. Accordingly, I employ a cord winding 11 for this type of tire of such depth only that a portion of the tread is reinforced. In this manner I gain only a portion of the strength of the construction of Fig. 1, but at the same time lose only a portion of the resiliency lost by the first construction.

It will then be apparent that the present invention comprehends a cord winding to be circumferentially applied upon the tire in individual lengths, the composite winding being of such depth as may be found most efficient to reinforce the tread of the tire while at the same time acting as a magnified breaker strip for the absorption of road shocks which would otherwise be transmitted to the weaker tire carcass.

What I claim is:

1. An elastic vehicle tire having embedded in the tread area thereof, a series of cords arranged in parallelism circumferentially of the tire, a portion or layer of said cord series occupying the position of the ordinary breaker strip upon the carcass of the tire.

2. A pneumatic tire including, a built up carcass portion, an outer resilient slab having a tread portion, and a combined breaker strip and tread reinforcing unit comprising rubber-coated cords laid in parallelism circumferentially of the carcass and forming a plurality of superposed layers extending from the outer surface of the carcass into the tread portion of the slab.

3. A pneumatic tire including, a built up carcass portion, an outer resilient slab having raised non-skid tread portions, and a combined breaker strip and tread reinforcing unit comprising rubber-coated cords laid in parallelism circumferentially of the carcass and forming a plurality of superposed layers extending from the outer surface of the carcass into the raised non-skid tread portions of the slab.

4. A pneumatic tire including, a built up carcass, an outer resilient slab having a tread portion, and a combined breaker strip and tread reinforcing unit comprising rubber-coated cords laid in parallelism circumferentially of the carcass and forming a plurality of superposed layers of successively diminishing width extending from the outer surface of the carcass into the tread portion of the slab.

5. A pneumatic tire including, a built up carcass, an outer resilient slab having raised non-skid tread portions, and a combined breaker strip and tread reinforcing unit comprising rubber-coated cords laid in parallelism circumferentially of the carcass and forming a plurality of superposed layers of successively diminishing width extending from the outer surface of the carcass into the raised tread portions of the slab.

6. A pneumatic tire including, a built up carcass, an outer resilient slab having raised non-skid tread portions, and a combined breaker strip and tread reinforcing unit comprising annular alternating layers of rubber and cord superposed upon the carcass and extending into the non-skid tread portions, the cords of the alternate layers lying in circumferential parallelism.

7. A pneumatic tire including, a built up carcass, an outer resilient slab having raised non-skid tread portions, and a combined breaker strip and tread reinforcing unit comprising annular alternating layers of rubber and cord superposed upon the carcass and extending into the non-skid tread portions, each layer being of less width than the preceding layer and the cords of the alternate layers lying in circumferential parallelism.

8. A pneumatic tire including, a built up carcass, an outer resilient slab having raised annular non-skid tread portions, and a combined breaker strip and reinforcing unit comprising annular alternating layers of rubber and cord superposed upon the carcass and extending into the annular non-skid tread portions, each layer being of less width than the preceding layer and the cords of the alternate layers lying in circumferential parallelism.

9. In a pneumatic tire including a fabricated carcass, a combined breaker strip and tread element mounted upon the carcass comprising loosely laid cords extending circumferentially of the carcass and disposed in superposed layers of gradually decreasing width, and an outer covering of rubber composition for said element arranged to overlap the edges thereof for connection to the carcass.

10. In a pneumatic tire including a fabricated carcass, a combined breaker strip and tread element arranged upon the carcass comprising loosely laid cords extending circumferentially of the carcass and disposed in superposed layers of gradually decreasing width, a layer of vulcanizable material between each layer of cords, and an outer covering of rubber composition for said element arranged to overlap the edges thereof for connection to the carcass.

In testimony whereof, I have signed my name.

BURGESS DARROW.